United States Patent [19]
Boyles et al.

[11] Patent Number: 6,056,001
[45] Date of Patent: *May 2, 2000

[54] METHODS FOR POSITIVELY ASSURING THE EQUAL DISTRIBUTION OF LIQUID AND VAPOR AT PIPING JUNCTIONS IN TWO PHASE FLOW BY INTERMITTENT FLOW INTERRUPTION

[75] Inventors: Jackie Ray Boyles, Sugar Land; James Raymond Stoy, Missouri City; James Lindsey Gilbert Schrodt, Houston, all of Tex.

[73] Assignee: Texaco Inc., White Plains, N.Y.

[*] Notice: This patent is subject to a terminal disclaimer.

[21] Appl. No.: 08/390,843

[22] Filed: May 1, 1995

Related U.S. Application Data

[63] Continuation-in-part of application No. 08/209,349, Mar. 14, 1994, abandoned.

[51] Int. Cl.[7] .................................................. F16K 11/044
[52] U.S. Cl. .................................. 137/4; 137/561; 137/875
[58] Field of Search ..................................... 137/875, 861, 137/4

[56] References Cited

U.S. PATENT DOCUMENTS

| 55,072 | 5/1866 | Doty | 137/875 |
|---|---|---|---|
| 4,718,457 | 1/1988 | Luger | 137/875 |
| 4,919,169 | 4/1990 | Bachmann et al. | 137/875 |

*Primary Examiner*—John Fox
*Attorney, Agent, or Firm*—Harold J. Delhommer; William J. Beard

[57] ABSTRACT

Equal distribution of two phase fluid between tow outlets is assured by an assembly which switches full fluid flow alternately between the two outlets on a timed basis. Distribution can be made for either impact T or branch T junctions without a quality variance as full flow is always directed into one or the other of the two outlets.

3 Claims, 3 Drawing Sheets

METHODS FOR POSITIVELY ASSURING THE EQUAL DISTRIBUTION OF LIQUID AND VAPOR AT PIPING JUNCTIONS IN TWO PHASE FLOW BY INTERMITTENT FLOW INTERRUPTION

This application is a continuation-in-part of Copending application Ser. No. 08/209,349 filed Mar. 14, 1994.

BACKGROUND OF THE INVENTION

1. The Field of the Invention

The present invention pertains to a method and device for assuring equal distribution of two phase flow at piping junctions and in particular to a method and device which alternately feeds the two phase flow to each of the two outlet legs of a junction.

2. The Prior Art

When a mixture of liquid and vapor enter a piping junction, such as a T junction, it often occurs that the relative proportion of vapor and liquid leaving the outlet legs of the junction is different than the proportion of the vapor and liquid entering inlet leg of the junction; the ratio of vapor and liquid at one outlet leg will be substantially higher than that at the inlet leg, while the other outlet leg will have a vapor to liquid ratio substantially lower than that at the inlet leg. This phenomenon has come to be called phase splitting in the technology of multiphase flow.

Phase splitting behavior has a detrimental effect in many industrial operations, notably the distribution of saturated or wet steam to steam injection wells in oilfield being treated with thermally enhanced oil recovery. In these operations, the ratio of the mass of vapor to the total mass is known as steam quality. It is well known in the art of thermally enhanced oil recovery that it is desirable to cause steam of equal quality to be delivered to each of the steam injection wells.

In oilfield steam distribution systems, a single steam source serves many widely distributed steam injection wells. In practice the single steam stream from the source is divided into multiple streams by ordinary piping junctions, most commonly T junctions. Unfortunately, the use of these simple junctions promotes phase splitting, which causes the liquid and vapor phases of the steam to be distributed unevenly among the injection wells; some of the wells receiving steam of a quality higher than the source steam quality and some of the wells receiving steam of a quality lower than the quality of the source.

Recently several types of apparatus have been employed in oilfield steam operations in an attempt to reduce and/or eliminate phase splitting. Several involve the use of static mixing devices, which serve to cause the liquid portion of the steam to become thoroughly mixed as tiny droplets dispersed within the vapor stream. The "pseudo-single-phase" mist stream is then divided by ordinary piping junctions or other means, some of which employ flow dividing plates or vanes. Some of these flow dividing devices incorporate a means for fixedly adjusting the position of the dividing device corresponding to the desired ratio of flow rates at the outlet legs of the junction. Other devices offer no provision for adjustment. The unfortunate and undesirable consequences of operating any of the devices which employ a mixing means is that they all cause a significant and permanent reduction in the pressure of the flow stream.

Some examples of the prior art can be found in U.S. Pat. No. 5,165,450, which shows a movable plate used to divide a single fluid stream into two streams. U.S. Pat. No. 5,251,662 shows a device having both static mixer means and a flow proportioning movable plate means. U.S. Pat. No. 5,291,911 shows another flow proportioning device utilizing conical segments.

SUMMARY OF THE INVENTION

The present invention deals with an apparatus which eliminates phase splitting with no pressure losses and only minor perturbation to the flowing fluids. The following aspect of the present invention is unique. All other devices in the prior art attempt to divide the flow into two concurrently flowing streams of equal physical properties. The present invention divides the incoming flow into time segments or slugs, each of which has only one possible path through which to exit the junction.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
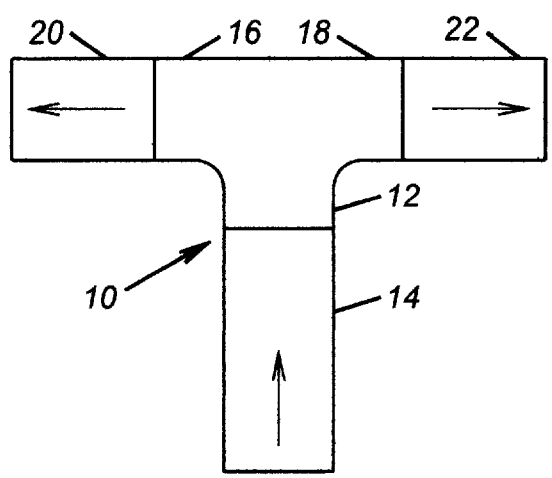
FIG. 1 schematically represents a typical impact T junction.
Figure 2:
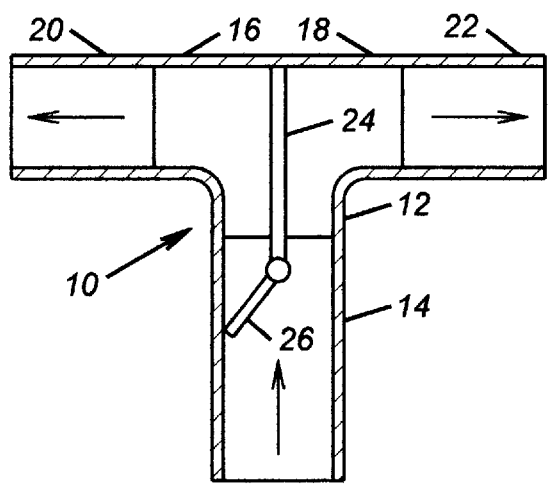
FIG. 2 schematically represents the impact T junction of FIG. 1 with a first embodiment of the present invention installed therein.

A common installation of a typical impact T junction is shown in FIG. 1 with the junction 10 having an inlet leg or branch 12 connected to a pipe 14 leading to a source (not shown) and outlet legs 16, 18 connected, respectively, to pipes 20, 22 leading to end use devices (Also not shown). This installation is shown in FIG. 2 modified by the addition of the present invention. A fixed plate 24 is mounted in the junction extending normal to a plane formed by the axes of the inlet branch and outlet legs of the junction. The fixed plate 24 extends into the inlet pipe and has on its free end a swinging plate or gate 26. Means (not shown) are provided to alternate the position of the plate between the extreme side positions to alternately direct the incoming steam to one or the other of the outlet legs 16, 18.

Figure 3:
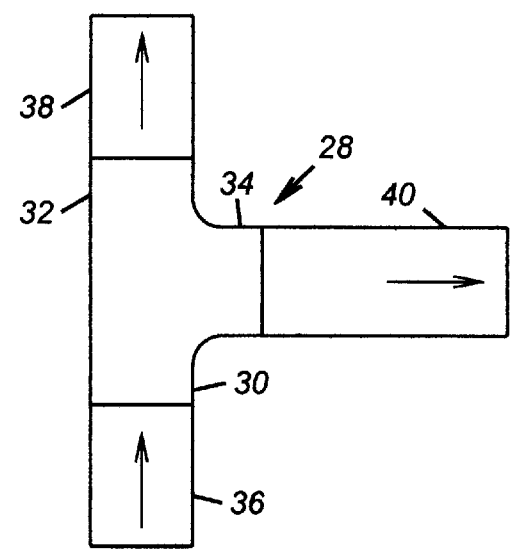
FIG. 3 schematically represents a branch T junction.
Figure 4:
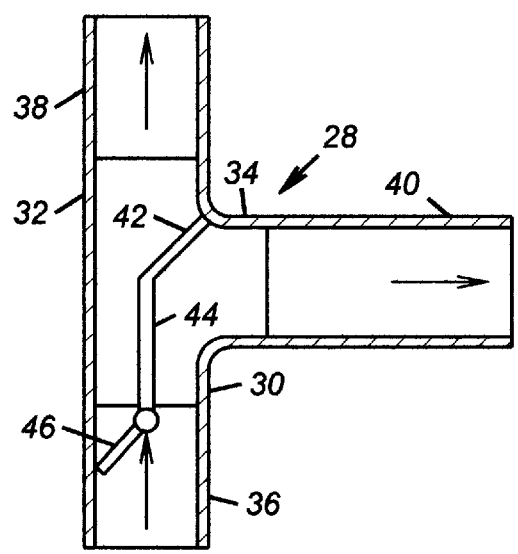
FIG. 4 schematically represents the branch T junction of FIG. 3 with an embodiment of the present invention installed therein.

A common straight through or branched T junction are shown in FIGS. 3 and 4 with the junction 28 having an inlet leg 30 and outlet legs 32, 34, each connected to respective pipes 36, 38, 40. FIG. 4 shows this arrangement modified by the present invention with the installation of fixed plates 42, 44 and movable plate or gate 46. Plate 44 extends along the axis of the inlet leg 30 and outlet leg 44 and is normal to a plane formed by the axes of the inlet and outlet legs. The plate 42 is fixed to plate 44 at the geometric center of the junction and to the intersection of the outlet legs. The gate plate 46 is mounted on the upstream end of the plate 44 and means (not shown) are provided to alternate the gate plate between the two extreme positions, one of which is shown.

In both of these embodiments the gate plate is caused to change position alternately from fully left of center to fully right of center. The edge of the plate, being shaped to conform to the shape of the internal wall of the junction inlet pipe, forms a seal preventing the flow of fluids from passing around the edge of the plate. This diverts the incoming two phase flow such that when the plate is in the left position, 100% of the flow is directed the right junction outlet. Likewise when the plate is in the right position, 100% of the incoming two phase flow is directed to the left junction outlet. The plate is manipulated by any well known pneumatic or electronic or mechanical means to alternate between the full left and full right positions. The relative proportion of time spent in the left position is adjusted to equal the known or desired proportion of the total mass flow through the right junction outlet.

For example, let us assume that it is desired to cause a flow split such that 75% to the total flow exits from the right branch of the junction, and 25% of the flow exits from the left junction. A time based two position control mechanism shown in FIG. 2 and FIG. 4 can be attached to a solenoid 29 actuated shaft 27 movably attached to the gate plate 26 where the shaft 27 passes through the wall of the pipe by means of a seal assembly (not shown) or packing gland. Devices suitable for this purpose are the Schraeder-Bellows Pneumatic Solenoid Valve Model L 695497 1149 or the Schraeder-Bellows Electric Solenoid Model K014-30354, both of which are available from McKenzie Equipment Co. of Houston, Tex. The timing of the two position control mechanism 27, 29 is controlled by a timing controller 29A (FIG. 2 or FIG. 4) and is adjusted to cause the gate plate to reside in the left position (diverting the flow to the right exit) for three times as long as it resides in the right position. Various types of timing devices are suitable for this type of control including mechanical, electric, electronic and pneumatic operated devices. One such device which has been used is the Cramer Company Cycle Timer Part No. 10180 which is available from The Newark Electronics Co. of Houston, Tex. The two position actuator can be any type of mechanism which causes the timer's signal to be converted into mechanical action, such as an electric motor driven rod, a pneumatic diaphragm or cylinder, an hydraulic cylinder, an electromagnetic (solenoid) plunger and many other types. Those cited above are intended to be illustrative only and not limitative of the invention.

The performance of the device is measured by its ability to eliminate phase splitting will be, in part, affected by the speed at which the gate plate is caused to alternate from left to right. Fast acting actuators would be preferable such that the gate plate spends as little time as possible in transit. Further, a fast acting actuator would allow the total cycle time to be reduced, which would in turn minimize pressure fluctuations at the junction outlets.

Figure 5:
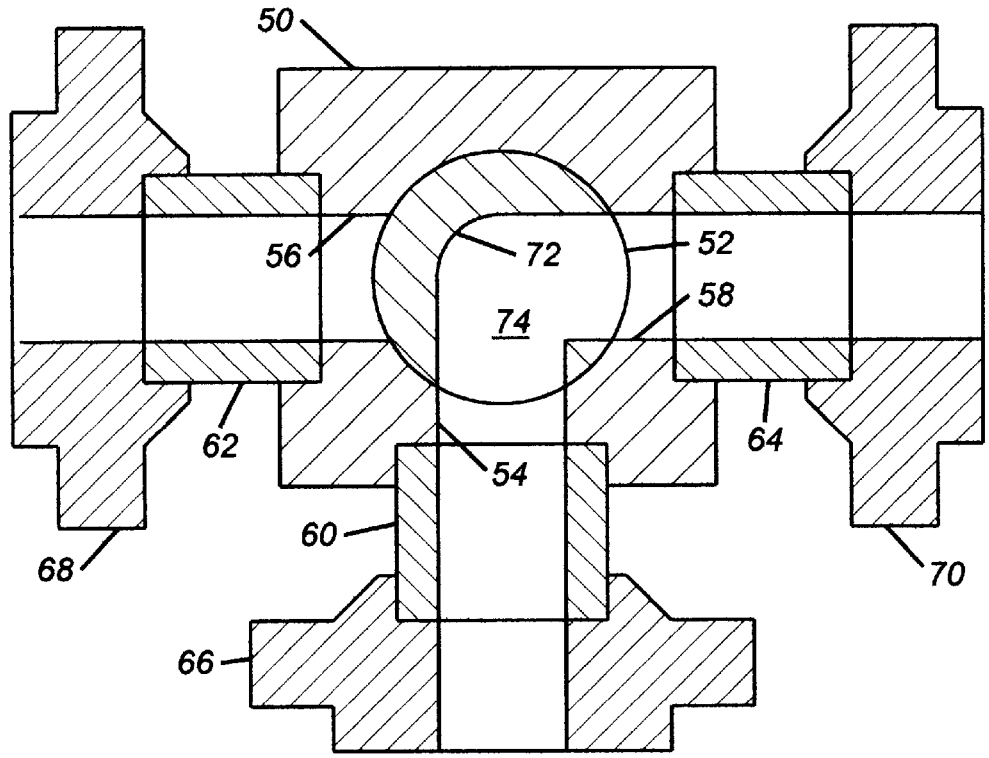
FIG. 5 is a plan view taken through a horizontal section along line 5—5 of FIG. 6.
Figure 6:
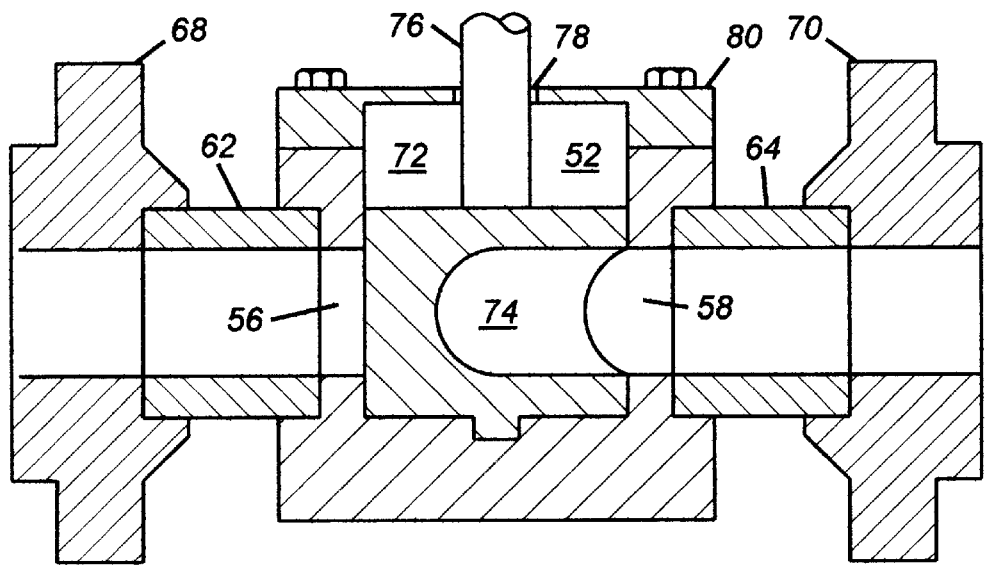
FIG. 6 is a vertical section along line 6—6 of FIG. 5.

Turning now to the embodiment of a impact T junction of the present invention shown in FIGS. 5 and 6, a central housing 50 has a cylindrical cavity 52 therein. Inlet passage 54 and outlet passages 56, 58 open into cavity 52. Each passage has a connection 60, 62, 64 and coupling 66, 68, 70, respectively thereon. A rotor 72 is rotatably mounted in the cavity and has a right angled passage 74 formed therein. Actuator means (not shown) are connected to the rotor 72 by shaft 76 which extends through an aperture 78 in cover 80 closing the cavity 52 and retaining the rotor 72 therein.

The operation of this embodiment is readily apparent. The rotor 72 would be selectively rotated in a clockwise and counter clockwise direction to selectively bring passages 54, 56 into communication through passage 74 and to bring passages 54, 58 into communication through passage 74.

Figure 7:
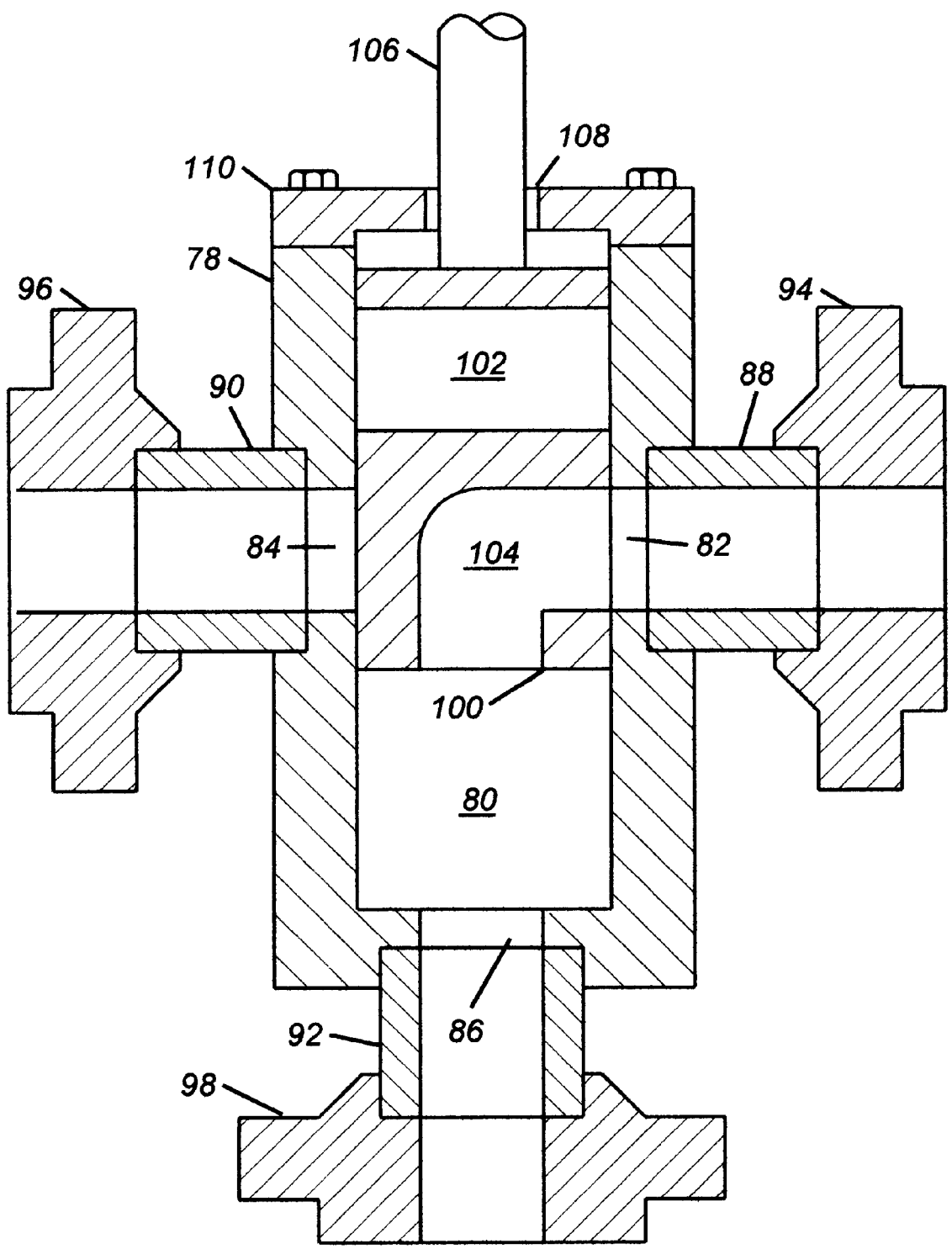
FIG. 7 is a view similar to FIG. 5 showing a further alternate embodiment of the present invention.

An alternate embodiment of a branch T junction in accordance with the present invention is shown in FIG. 7. This embodiment has a housing 78 defining an elongated cavity 80 having an inlet passage 82 and outlet passages 84, 86 opening therein. Each passage is coupled to a connection 88, 90, 92, respectively, and each of these has a coupling 94, 96, 98, respectively thereon. A member 100 is reciprocatively mounted in cavity 80 and has a through bore 102 and a right angled bore 104 therein. Actuator means (not shown) are connected to member 100 by shaft 106 which extends through an aperture 108 in cover 110 closing one end of elongated cavity 80 and retaining the member 100 therein.

The operation of this embodiment is simply moving the member 100 with a reciprocal motion to alternately bring bores 102 and 104 into alignment with the inlet passage 82. The opposite end of the bores will alternately be aligned with outlet passages 84, 86.

None of the conventional seals and gaskets have been shown in the figures, for clarity, and because they do not form an actual part of the present invention.

The actuation means also does not form an actual part of the present invention, although it is essential for its operation. A suitable actuation means is represented by the Bettis CB315 double acting actuator which operates at 100 psi and can provide 560 in/lbs of torque. This unit can operate up to 350° and can actuate in 2 seconds (with a maximum of three strokes per minute). However, the speed of operation is really dependent on the associated control valve means.

The present invention may be subject to many modifications and changes without departing from the spirit or essential characteristics thereof. The foregoing embodiments should therefor be considered in all respects as being illustrative and not restrictive of the scope of the present invention as defined by the appended claims.

We claim:

1. A method for assuring the equal phase distribution and steam quality of a two phase mixed steam flow having a gaseous phase and a liquid phase, in a steam flow line having a junction inlet and two junction outlets, and for distributing said two phase mixed steam flow in a preselected distribution ratio between said two junction outlets, comprising the steps of:

providing a steam flow diverting means movably arranged at said junction inlet and activating said diverting means to alternately divert all of said two phase mixed steam flow to a selected one of said two junction outlets; and controlling the movement of said steam flow diverting means to deliver said two phase mixed steam flow in said flow line in a timed manner alternately to each of said two junction outlets to achieve said preselected distribution ratio of said two phase mixed steam flow between said two junction outlets.

2. The method of claim 1 wherein each of the steps is performed in a steam flow line having a branch T junction.

3. The method of claim 1 wherein the step of activating said diverting means is performed by pivoting a gate plate in said junction inlet to divert all steam flow to one of said two junction outlets.

* * * * *